Feb. 2, 1971  S. D. DE LAJARTE ET AL  3,560,181
METHOD AND APPARATUS FOR CONTROLLING THE WIDTH
AND THICKNESS OF FLOAT GLASS
Filed Nov. 28, 1967  2 Sheets-Sheet 1
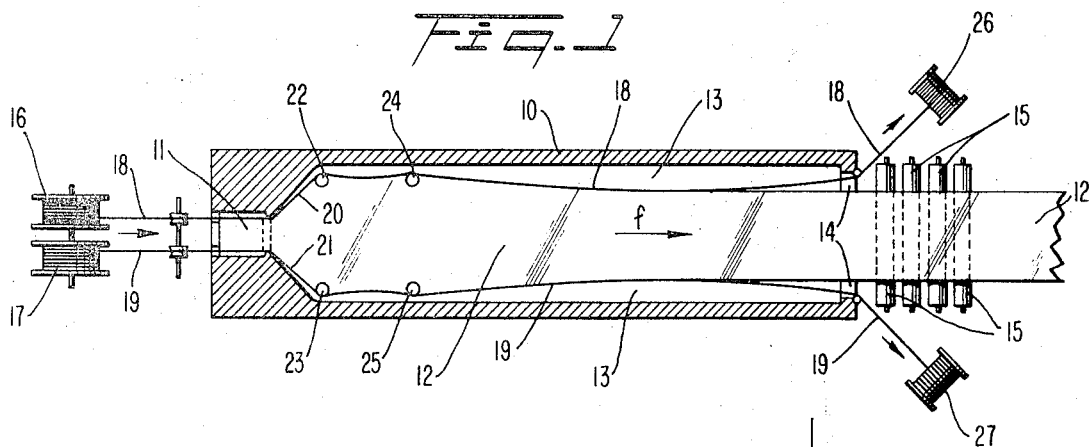
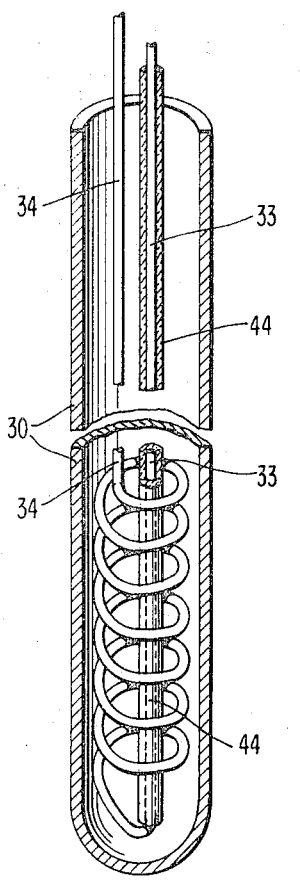
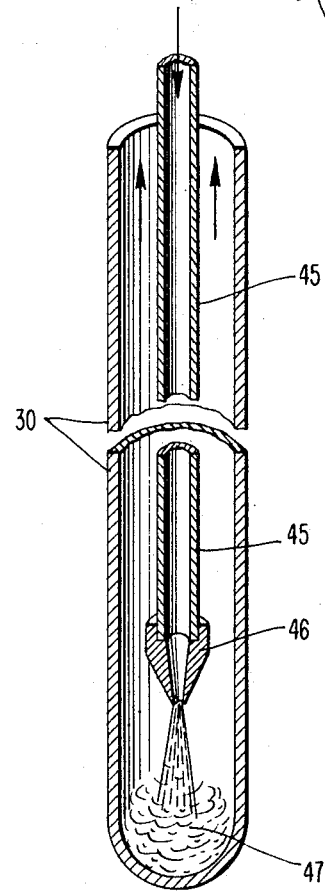
INVENTORS
STÉPHANE DUFAURE DE LAJARTE
MAURICE BOURGEAUX
BY
Bauer and Seymour
ATTORNEYS

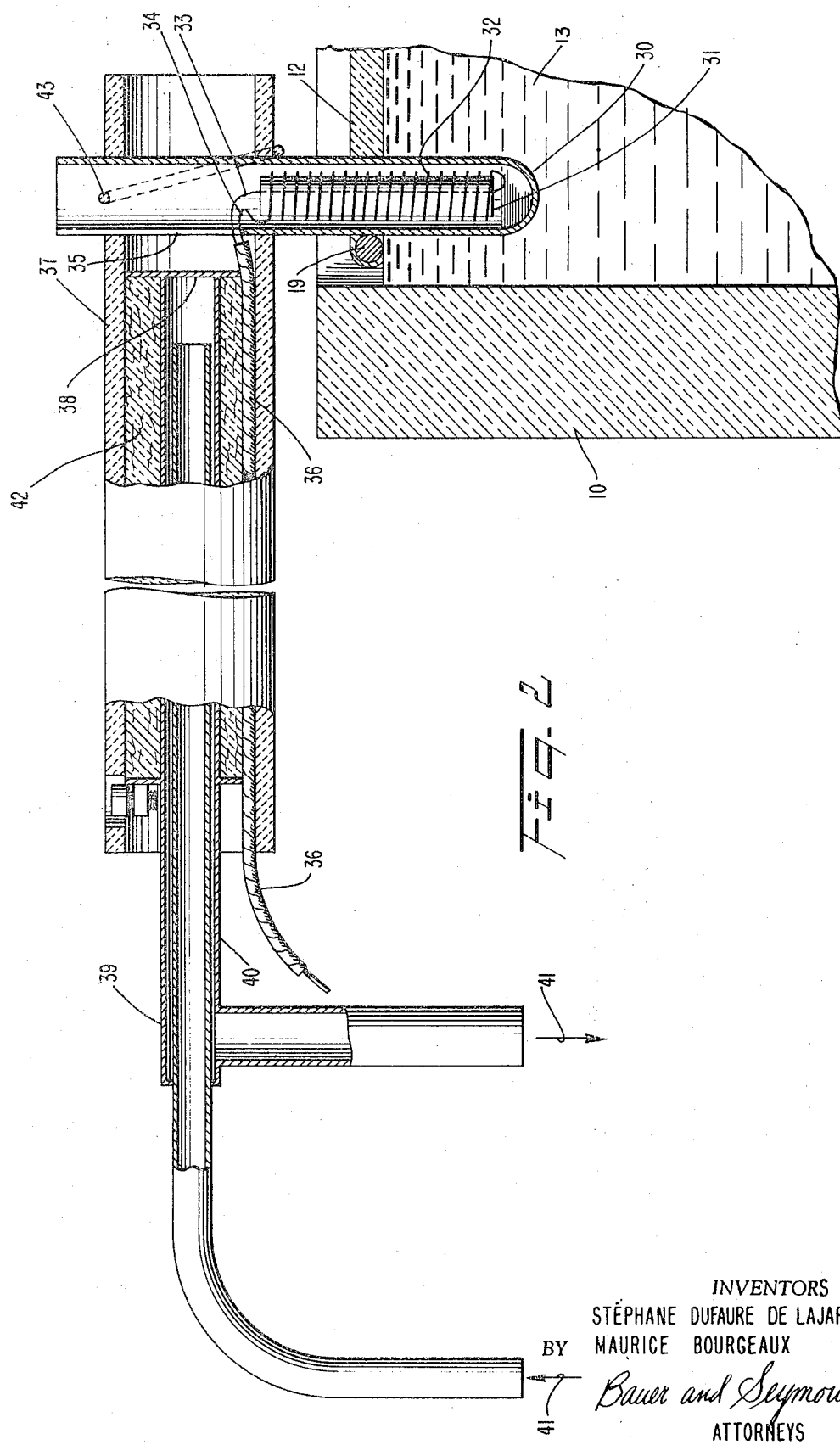

United States Patent Office 3,560,181
Patented Feb. 2, 1971

3,560,181
METHOD AND APPARATUS FOR CONTROLLING THE WIDTH AND THICKNESS OF FLOAT GLASS
Stéphane Dufaure de Lajarte and Maurice Bourgeaux, Paris, France, assignors to Compagnie de Saint-Gobain, Neuilly-sur-Seine, France
Filed Nov. 28, 1967, Ser. No. 686,227
Claims priority, application France, Dec. 8, 1966, 86,656
The portion of the term of the patent subsequent to Sept. 23, 1986, has been disclaimed
Int. Cl. C03b 18/00
U.S. Cl. 65—91                                    6 Claims

ABSTRACT OF THE DISCLOSURE

A method and apparatus for preventing the thickening and shrinking of glass sheet which employs flexible wire spreaders which travel within the edges of the glass and heated mechanical guides which sustain the efforts of the wires by being positioned inside the wires and through the glass sheet as the sheet progresses downstream.

---

This invention is an improvement over prior applications Ser. Nos. 359,921, now Pat. No. 3,326,653, 442,942, now Pat. No. 3,413,017, and 471,642, now Pat. No. 3,468,649. As to all common subject matter, this case is entitled to the filing dates of such applications and to all common subject matter this application is entitled to the benefit of the corresponding filing dates in France. As to matter new in this case, this application claims the benefit of French application Ser. No. 86,656 of Dec. 8, 1966.

This invention is an improvement on the glass furnaces and end processes which are described in the foregoing applications. It relates to a process of making flat glass by flotation of the newly formed sheet on a molten bath, usually of molten tin. An elongated tank is provided, filled with molten tin, the molten glass sheet is admitted at one end of the tank, drawn over the surface of the molten metal and cooled from its initial molten state to a condition in which it can be handled by ordinary handling means while undergoing surface leveling and fire polish, while attaining a state of equilibrium between the forces of surface tension and gravity. When ordinary glass, such as is used in making window panes, is being made equilibrium produces a sheet of 6.5 mm. in thickness. It is desirable to make thinner sheet and in order to accomplish this various means and processes have been adopted to restrain the glass against the forces tending to stabilize it. The processes described in the identified cases are particularly successful in this regard, operating upon the principle of introducing flexible, tensioned guide means or elements such as wires in the glass at the edges of the sheets, the wires under tension acting to restrain the lateral shrinkage of the sheet and the forces of surface tension and gravity. The effect of such apparatus is highly beneficial but the flexibility of the guide means still permits some shrinkage. However, it was disclosed in application 471,642 that the action of the guides could be improved by a surprising discovery that posts could be thrust through the glass sheet inside and in contact with the guide wires and that the fluid glass sheet would flow around the posts without separating from the wires or dividing the sheet. Nevertheless, it has been discovered that the posts become increasingly ineffective in the cooler regions of the furnace so that their use has been largely limited to the upstream end of the tank. The posts have been made by refractory materials such as alumina and sillimanite which are wetted by the glass.

It is an object of this invention to extend the use of the posts or similar mechanical abutments into downstream regions of the flotation tank. It is also an object of the invention to devise means capable of carrying out the new method.

The present invention depended upon two discoveries, the first that, if the viscosity of the glass sheet is less than 50,000 poises or thereabouts, this value being for ordinary glass such as employed in windows, the posts cannot be used and the natural flexibility of the guide wires permits the lateral shrinkage and the thickening of the sheet. The second discovery is that if a post be constructed which can be internally heated it can be passed through such cooler glass and will act upon the contiguous glass to fluidify its viscosity to the extent necessary for the glass to divide at the post, pass around it, and again unite with the flexible guide element downstream. For ordinary glass a viscosity of 50,000 poises represents a temperature on the order of 950° C. For glasses of other composition equivalent figures will be found. As a result of this discovery, this problem has been solved and the mechanical abutments which prevent the indrawing of the edge guides can be used in any part of the tank and not merely at the upstream end.

The novel process involves individually heating the mechanical abutments that penetrate the sheet and sustain the guide thus creating near these heated pieces a limited region in which the glass is locally elevated in temperature to an extent sufficient to lower its viscosity below 50,000 poises, the glass sheet being self-united downstream of the post. The invention also involves the conception of heated posts appropriate to this service.

The advantages of this invention are substantial and include the ability to use spacing means for the wire spreaders in a region of the furnace where the viscosity of the glass is above 50,000 poises, the guides being prolonged beyond the regions where they have heretofore been successful. In practice, this invention is even more successful than it appears in theory because it produces a glass sheet of which the width and thickness remain substantially identical throughout the length of the tank from initial formation to handling hardness. The metallic bath over which the sheet moves is, surprisingly, endowed by this invention with a better yield because it is possible to use substantially the whole surface area, which was not true of prior flotation processes. Furthermore, by reducing the shrinkage of the sheet during hardening, the movements of the glass within the sheet are limited producing glass with fewer defects of surface which previously arose from imperfect homogeneity in the glass, local and accidental variations in temperature, and unequal tensioning and warping of the sheet.

In the following drawings, we have illustrated the structure of apparatus of preferred type corresponding to the mechanical phase of this invention.

FIG. 1 is a diagrammatic plan view, partly in section;

FIG. 2 is a vertical sectional view to an enlarged scale of apparatus according to this invention;

FIG. 3 is a vertical section through an electrically heated post; and

FIG. 4 is a vertical section through a post heated by combustion.

In FIG. 1, a tank 10 has sheet forming means 11 at one end which shapes a glass sheet 12 and lays it upon a molten tin bath 13 from whence it travels in the direction of arrow *f* toward the discharge port 14, from whence it travels to rollers 15 and to such treatments as may follow. Drums 16, 17 deliver wires 18, 19 through appropriate openings in the end of the tank into the edges 20, 21 of the glass sheet. The wires pass outside of posts or abutments 22, 23, 24, 25 which penetrate the sheet and enter into the molten bath which supports it. The forces of surface tension tend to reduce the lateral dimensions of the sheet between the upstream and downstream posts. The sheet does undergo some reduction in width in the downstream regions below posts 24, 25. The wires 18, 19 are put under tension by drums 26, 27 which tends to keep them taut and to oppose the tendency of surface tension to contract the sheet. The tension can be adjusted by using brakes on drums 16, 17. The wires are embedded in the edges of the sheet and move at the same speed as does the sheet, acting not only to control its width but to coordinate the speeds of its edges, preventing warping by sidewise movement. Some lateral reduction occurred downstream of the posts as indicated on the drawing. The drawing is not intended to be to scale.

It is an object of this invention to reduce the lateral reduction of the sheet in those regions of the furnace to which the post could not previously be admitted.

In FIG. 2, the furnace wall is shown at 10, the bath of molten metal at 13, the glass sheet at 12 and at 19, one of the wires embedded in the edge of the glass. A tubular post 30 passes through the glass sheet inside and in contact with the wire 19. The post is hollow and contains a cylindrical insulator 31 about which is wound a heating coil 32 which is supplied by leads 33, 34 which are connected to a source of electric current not shown. The power put into this heating coil will be sufficient to heat the hollow post to a temperature such that the glass in its immediate vicinity will have a viscosity below about 50,000 poises. The post has a slot 35 in one side through which the leads pass to an insulating cable 36. A support 37 in the form of a hollow refractory tube, is supported above the metal bath by a support not show, the outer end of the tube projecting beyond the wall of the tank. The interior of the tube is sealed off by a wall 38. Concentric tubes 39, 40 serve to control the temperature of tube 37 and its contents within reasonable bounds by the flow of refrigerant 41 on known principles. Insulating packing 42 may also be used within the tube. The post 30 is supported in upper and lower apertures in the inner end of tube 37 by a refractory wire 43 which passes through apertures in the upper part of the tube.

In FIG. 3 is shown a form of post 30 which omits the cylindrical insulator 31 but encloses one of the leads 33, 34 within insulation capable of withstanding the temperatures involved, for instance ceramic insulation 44.

In FIG. 4 the post 30 is supplied with a combustible mixture of gas and air by a tube 45 which has a burner 46 at its end delivering flame 47 to the interior of the post.

This invention controls the downstream width of the sheet and thus makes a better use of the surface of the flotation bath by keeping the edges of the sheet in alignment, by moving them at the same speed and by preventing lateral shrinkage, the appearance of defects of surface arising from wandering of the sheet on the bath and the effect of heterogeneity in the glass and local variations of temperature in the tank are greatly reduced.

The posts and the supports for the heater may be made of aluminous refractories or other refractories of which many types satisfactory for glass making have been described in the art. The horizontal tube may be made, for example, of silicon carbide. A flow of water through the horizontal tube 37, or cold air is usually sufficient for cooling purposes.

The quantity of current necessary to heat the glass surrounding the posts below a viscosity of 50,000 poises will depend on the thickness of the sheet, the temperature differential between the sheet and the post, the speed of the sheet and the composition of the sheet. For ordinary glass of the type used in windows which travels at a speed of 150 to 200 meters per hour, a temperature differential of 50° C. is satisfactory. For example, if the general temperature of the sheet at a particular downstream location in the furnace is 800° to 900° C. which corresponds to a viscosity of about 250,000 poises, a satisfactory result will be achieved if the temperature of the post is on the order of 980° to 1000° C., which reduces the viscosity to about 12,000 poises.

As many apparently widely different embodiments of the present invention may be made without departing from the spirit and scope thereof, it is to be understood that the invention is not limited to the specific embodiments.

What is claimed is:

1. In a method of controlling the width and thickness of glass sheet under manufacture by a molten metal flotation procedure by cooling the sheet to handling temperature as it moves on and along the surface of the molten metal, putting the sheet under lateral tension by embedding flexible tensioned guide elements in the edges of the sheet, moving the guide elements as a unit with the sheet, and maintaining the spacing of the guide elements and the width of the sheet by mechanical abutments which pass through the molten glass sheet at respective points spaced along the guide elements and in contact with the guide elements, the improvement comprising the step of locally internally heating each abutment to correspondingly heat the glass in the vicinity immediately surrounding each abutment to a temperature such that the locally heated glass in the vicinity of each abutment is maintained at a viscosity not greater than about 50,000 poises.

2. In a glass furnace for making glass sheet by flotation on molten metal, a flotation tank confining a pool of molten metal, flexible tensioned guide elements each secured to and along a respective side edge of the molten glass sheet, and moving as a unit with the sheet, over and along the molten metal, first and second laterally-spaced abutments each projecting through the molten glass sheet and in contact with the confronting surface of a respective one of said guide elements, to maintain the predetermined separation thereof and the width of the glass sheet, the improvement comprising means positioned within each said abutment to internally heat each said abutment and thereby the molten glass immediately surrounding it.

3. Apparatus according to claim 2, each said abutment being hollow, and electrical heating means disposed within each said abutment.

4. Apparatus according to claim 2, each said abutment being hollow, and flame heating means disposed in each said abutment.

5. Apparatus according to claim 2, each said abutment comprising a post, a tubular support extending at one end laterally over a respective one of said guide elements and supporting its respective post in depending vertically adjustable position from said one end, and conduit means connected to conduct cooling fluid to and to exhaust the same from, the interior of said tubular support.

6. In apparatus for the production of flat glass, a tank containing a pool of molten metal on which molten glass is deposited at one end of the tank and drawn along in ribbon form over the surface of the pool while being gradually cooled to essential solidity on arrival at the other end of said tank, means associated with said tank for guiding and tensioning first and second flexible guide elements secured to and extending continuously along respective side edges of the ribbon of glass and moving as a unit therewith during its travel from one end of said tank to the other, first and second pairs of hollow posts, the posts of each respective pair being spaced laterally of and in said tank, each said pair being spaced in the direction of movement of the ribbon and the length of said tank, each said post of each said pair being positioned in said tank to contact a respective one of the guide elements on the side thereof nearest the other guide element, to maintain said guide elements in spaced relation transversely of said tank, and means positioned within each said post for individually internally heating the same, to correspondingly heat to a predetermined desired temperature, the glass of a ribbon in the vicinity contiguous to each of said posts.

References Cited

UNITED STATES PATENTS

| | | | |
|---|---|---|---|
| 1,790,774 | 2/1931 | Spinasse | 65—91 |
| 3,294,515 | 12/1966 | Bager et al. | 65—199 |
| 1,761,219 | 6/1930 | Mambourg | 65—91 |
| 3,445,214 | 5/1969 | Ormesher | 65—99A |
| 3,450,518 | 6/1969 | Itakura et al. | 65—182 |

S. LEON BASHORE, Primary Examiner

J. B. HARDAWAY, Assistant Examiner

U.S. Cl. X.R.

65—99A, 182, 356